US008290636B2

(12) United States Patent
Manning

(10) Patent No.: US 8,290,636 B2
(45) Date of Patent: Oct. 16, 2012

(54) POWERED RIDING APPARATUS WITH ELECTRONIC CONTROLS AND OPTIONS

(76) Inventor: Doug Manning, Banner Elk, NC (US)

( * ) Notice: Subject to any disclaimer, the term of this patent is extended or adjusted under 35 U.S.C. 154(b) by 828 days.

(21) Appl. No.: 12/106,323

(22) Filed: Apr. 20, 2008

(65) Prior Publication Data

US 2008/0262666 A1 Oct. 23, 2008

Related U.S. Application Data

(60) Provisional application No. 60/912,940, filed on Apr. 20, 2007.

(51) Int. Cl.
G05D 1/00 (2006.01)
G05D 7/00 (2006.01)
B60L 3/00 (2006.01)
G06F 17/00 (2006.01)
H04Q 9/00 (2006.01)

(52) U.S. Cl. ........... 701/1; 701/21; 701/36; 340/870.07; 340/901

(58) Field of Classification Search ................ 701/1, 21, 701/36, 45, 200, 206, 207, 208, 213, 300, 701/400, 408, 409, 415; 340/850, 870.01, 340/870.07, 870.09, 995.1, 984, 990, 995.12, 340/995.16, 995.27
See application file for complete search history.

(56) References Cited

U.S. PATENT DOCUMENTS

| 4,155,186 | A | | 5/1979 | Robinson |
| 4,350,113 | A | | 9/1982 | Moreau et al. |
| 5,017,166 | A | | 5/1991 | Chang |
| 5,204,372 | A | | 4/1993 | Wilson et al. |
| 5,582,529 | A | | 12/1996 | Montgomery |
| 5,900,806 | A | * | 5/1999 | Issa et al. ............... 340/426.25 |
| 6,033,276 | A | * | 3/2000 | Han .............................. 441/135 |
| 6,192,817 | B1 | * | 2/2001 | Dec et al. ................... 114/55.56 |
| 6,461,204 | B1 | * | 10/2002 | Takura et al. ..................... 440/6 |
| 6,702,634 | B2 | | 3/2004 | Jung |
| 6,901,872 | B1 | | 6/2005 | Battle et al. |
| 6,904,341 | B2 | * | 6/2005 | Kish et al. ........................ 701/21 |
| 7,037,153 | B1 | | 5/2006 | Wynne |
| 7,097,521 | B1 | | 8/2006 | Papadakis |
| 7,444,213 | B2 | * | 10/2008 | Motose .......................... 701/21 |
| 7,496,434 | B2 | * | 2/2009 | Fossen et al. ................... 701/21 |
| 7,627,427 | B2 | * | 12/2009 | Nichols et al. ............... 701/213 |
| 2001/0042498 | A1 | * | 11/2001 | Burnham ................... 114/55.56 |
| 2003/0074114 | A1 | * | 4/2003 | Okuyama et al. ............... 701/21 |
| 2003/0074831 | A1 | * | 4/2003 | Schneider ................... 43/44.99 |
| 2003/0093196 | A1 | * | 5/2003 | Okuyama ........................ 701/21 |
| 2003/0191562 | A1 | * | 10/2003 | Robertson et al. .............. 701/21 |
| 2004/0059477 | A1 | * | 3/2004 | Kish et al. ........................ 701/21 |
| 2004/0093129 | A1 | * | 5/2004 | Majstorovic et al. ............ 701/1 |
| 2005/0288833 | A1 | * | 12/2005 | Motose .......................... 701/21 |
| 2007/0003980 | A1 | | 1/2007 | Woods et al. |
| 2008/0046179 | A1 | * | 2/2008 | Mackintosh et al. ......... 701/213 |
| 2008/0174455 | A1 | * | 7/2008 | Staerzl .......................... 340/984 |
| 2009/0187297 | A1 | * | 7/2009 | Kish et al. ........................ 701/21 |
| 2009/0198395 | A1 | * | 8/2009 | Winsky et al. ................... 701/21 |
| 2010/0030411 | A1 | * | 2/2010 | Wilson et al. ................... 701/21 |

OTHER PUBLICATIONS

Coolest-gadgets.com,"Bluetooth Glove Controller of the Future", Date unknown, 5 pages.

(Continued)

Primary Examiner — Thomas Tarcza
Assistant Examiner — Edward Pipala
(74) Attorney, Agent, or Firm — Monty Simmons; Simmons Patents

(57) ABSTRACT

The present invention relates to a power riding apparatus with electronic options, a wireless user interface for control such apparatus, and a wave-information-system. One embodiment of the power riding apparatus is a surf board configured with a booster system. The booster system is electrically associated with an onboard controller. The onboard controller is in wireless communication with a user interface associated with a user. The user activates the user interface as desired to control the booster system and activate other board features such as: lighting system, repellant system, anti-theft system, entertainment system, recording system, and communication system. Embodiments of the invention include surf boards, water boards of all types, as wells as boards with wheels such as skate boards.

20 Claims, 11 Drawing Sheets

OTHER PUBLICATIONS

Brian Handwerk, "New Shark Repellent Uses Chemical Signals", National Geographic News, Jul. 29, 2004, 2 pages.

Chuck Husick, "Fish Finders", www.boatus.com, Date Unknown, 4 pages.

SharkDefense, "Chemical Repellents", www.sharkdefense.com, date unknown, 1 page.

Eric M. Stroud, Michael M. Herrmann & Dr. Samuel H. Gruber, "Chemical Shark Repellent Research and Development", Bimini Biological Field Station, Date Unknown, 1 page.

Sisneros, Joseph A., Nelson, Donald R., Surfactants as Chemical Shark Repellents: past, present, and future, Kluwer Academic Publishers, pp. 117-129 (2001), 14 pages.

Author Unknown, "CAD is key for innovative motorized surfboard", Machine Design, (Oct. 9, 2003) 3 pages.

* cited by examiner

POWERED RIDING APPARATUS WITH ELECTRONIC CONTROLS AND OPTIONS

CLAIM TO PRIORITY

This application claims priority to provisional application 60/912,940 filed on Apr. 20, 2007, the entire contents of which are incorporated herein by this reference for all purposes.

TECHNICAL FIELD OF THE INVENTION

The present invention relates to a power riding apparatus with electronic options. The power riding apparatus may include any of the following features: booster system, wireless control system, lighting system, repellant system, anti-theft system, entertainment system, recording system, and communication system. Embodiments of the invention include surf boards, water boards of all types, as wells as boards with wheels such as skate boards.

BACKGROUND OF THE INVENTION

Since the invention of the solid state transistor, advances in electronic based technology have had a dramatic impact on human existence. Such solid state electronics provided a means for sending a man to the moon and probes across the galaxy. Electronic computing devices hundreds of times more powerful than the computers used to send a person to the moon are now commonly owned by ordinary people. Wireless communication devices that were once only props in science fiction movies are now commonly used. Indeed, such advances in electronic technology have been leveraged to improve the standard of living of the general populace to a level unthinkable just a few generations ago.

New and novel implementations (and improvements) of such technologies now make it possible to improve designs of old prior mechanical devices such as devices used for recreation. Such devices may include skate boards, water boards such as surf boards, and other devices. For example, professional surfers, perhaps performing stunts for a movie production, may wish to perform a variety of surf riding maneuvers that would be either extremely difficult or nearly impossible to achieve without a booster propulsion system associated with the surfboard. Surfing enthusiast may wish to perform similar moves after seeing such maneuvers, or alternatively, develop their own moves. What is needed is a propulsion system and associated control system configured for being associated with a traditional surfboard where the control system allows a user to effectively control the power generated by the propulsion system.

It should be noted that while powered water skis have been developed, such as the one disclosed in U.S. Pat. No. 5,582,529 issued to Montgomery (incorporated by this reference for all that it discloses). Such water skis would not be considered "surf boards" in the traditional sense. The Montgomery device requires the use of an arm pole that terminates in the universal left or right hand grip comprising finger controls. In contrast, for traditional surfboards, a user stands on the surfboard and uses balance alone (not an arm pole) to ride the board.

Prior art devices described above have another limitation on their design; they provide little or no information to the user. What is needed is an electronic module that can be associated with such devices that can provide a plurality of information/features to a user including at least one of the following groups of information/features: location data for locating the device, emergency information, environmental warnings, control features, display technology, booster system, wireless control system, lighting system, repellant system, anti-theft system, entertainment system, recording system, and communication system.

SUMMARY

Some of the objects and advantages of the invention will now be set forth in the following description, while other objects and advantages of the invention may be obvious from the description, or may be learned through practice of the invention.

Broadly speaking, a principle object of the present invention is a booster system for a riding apparatus used by persons standing on the riding apparatus, said apparatus comprising a thrust generator electrically associated with a controller.

Yet another object of the invention is to provide a booster system for a riding apparatus used by persons standing on the riding apparatus, said apparatus comprising thrust generator electrically associated with a controller wherein said controller comprises a wireless interface.

Still another object of the invention is to provide a booster system for a riding apparatus used by persons standing on the riding apparatus, said apparatus comprising a force-to-movement converter (motor) mechanically associated with a substance-source (fuel) and electrically associated with a controller comprising a plurality of environmental sensors including: temperature, motion, sonar, location sensor, and imaging and sound recording devices.

Yet another object of the invention is to provide a booster system for a riding apparatus used by persons standing on the riding apparatus, said apparatus comprising a controller with a wireless interface and a remote module that is associated with a user, said remote module comprising a display for presenting system data to a user.

Another object of the invention is to provide a power water board comprising a booster system electrically associated with a controller wherein said controller includes a wireless interface in communication with a remote module associated with a user.

Another object of the invention is to provide for a power water board comprising a booster system electrically associated with a controller wherein said controller includes a wireless interface in communication with a remote module associated with a user and provides a plurality of features including: object warnings, temperature warnings, deterrent system, anti-theft system, wireless control system, position data, communication system, recording system, entertainment system, lighting system, and diagnostic information.

Another object of the invention is to provide for a wave-information system configured for detecting waves and determining various wave parameters and further configured for transmitting such information to remote devices.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.). Similarly, two or more items are "electrically associated" by bringing them together or into relationship with each other in any number of ways including: (a) a direct, indirect or inductive communication connection, and (b) a direct/indirect or inductive power connection.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
FIG. 1 is a top view of one exemplary embodiment of a water board showing an access point and lighting features.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into relationship with each other in any number of ways including: (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

This document includes headers that are used for place markers only. Such headers are not meant to affect the construction of this document, do not in any way related to the meaning of this document nor should such headers be used for such purposes.

While the particulars of the present invention and associated technology may be adapted for use with any type of apparatus such as a water board or a skate boarding apparatus, the examples discussed herein are primarily in the context of a surf board structure.

Referring now to FIG. 1 is a top view of a surfboard (10) showing an access point and lighting features according to one exemplary embodiment of the invention. For the presently preferred embodiment of the invention surfboard (10) is the general size and shape of a traditional surfboard. Surfboard (10) comprises access hatch (14) for covering an access point configured to allow access to interior components. Such access hatch (14) does not necessarily form a water tight seal. Toward the front of surfboard (10) are light modules 16a, 16b and 16c. It should be appreciated that such light modules may be positioned in other locations and that additional light modules may be added.

For the present embodiment of the invention, Light modules 16a, 16b, 16c, and 16d are low voltage; low power consumption modules that include a self contain replaceable battery. One suitable light technology includes light emitting diodes (LED). Such light modules are releasably associated with surfboard (10). For the preferred embodiment such light modules are electrically associated with a controller associated with a user. Such a configuration allows remote activation of the light modules as defined later in this document. Alternatively, such light modules may simply comprise a switching device that is actuated to turn on/off the light module. One possible switch type is a magnetic switch such as a reed switch or weigand wire that is actuated using a magnetic element. Such a switch enhances the ability to waterproof the module. For the preferred embodiment associated with a controller, such light modules comprise wireless communication circuitry configured for communication with a controller. For one embodiment, such communication capabilities include a receiver configured to receive control signals (such as a turn on/off signal) from the controller. For such an alternative embodiment, communication capabilities include a transmitter for transmitting data to a remote device such as the controller. Such transmitted data may include, for example, battery status information. Suitable communication technologies include Bluetooth and Zigbee.

Lighting modules 16a, 16b, 16c, and 16d may further comprise a local activation mechanism for enabling and disabling the lighting modules. For such a configuration, lighting modules 16a, 16b and 16c may be disabled to prevent unnecessary power drain by the receiver. Suitable activation mechanisms include a magnetic sensor such as a reed switch, Hall Effect device, weigand wire, or other suitable magnetic device.

For the preferred embodiment of the lighting modules 16a, 16b, 16c, and 16d comprising wireless communication capabilities, the module is fully self contained in a substantially water proof, shock resistant light housing. Such light housing is configured for being mechanically associated with surfboard (10). In addition, for one embodiment, at least one light module is configured for being disassociated with surf board (10) and carried and used as traditional flash light.

Figure 2:
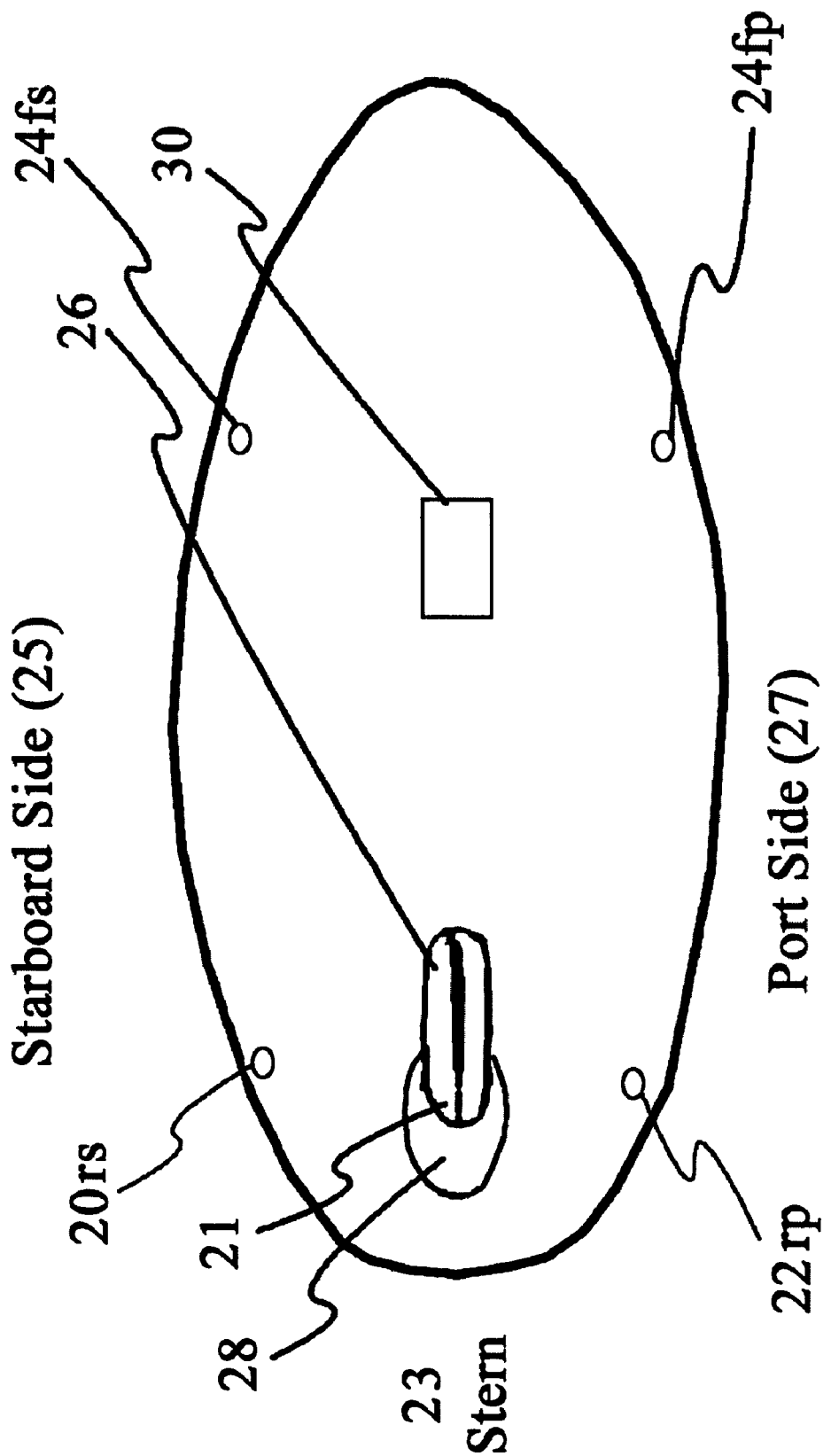
FIG. 2 is a bottom view of one exemplary embodiment of a water board showing output ports, intake, a deterrent system output ports, and a control rudder.

Referring now to FIG. 2, a bottom view of the exemplary embodiment of the present invention depicted in FIG. 1 is presented. Surfboard (10) comprises output port (20rs) (rs=rear, starboard), (22rp) and (28). It should be appreciated that any number of ports may be used, including only one port, without departing from the scope and spirit of the invention. The function of such ports will be described in more detail below.

Figure 4:
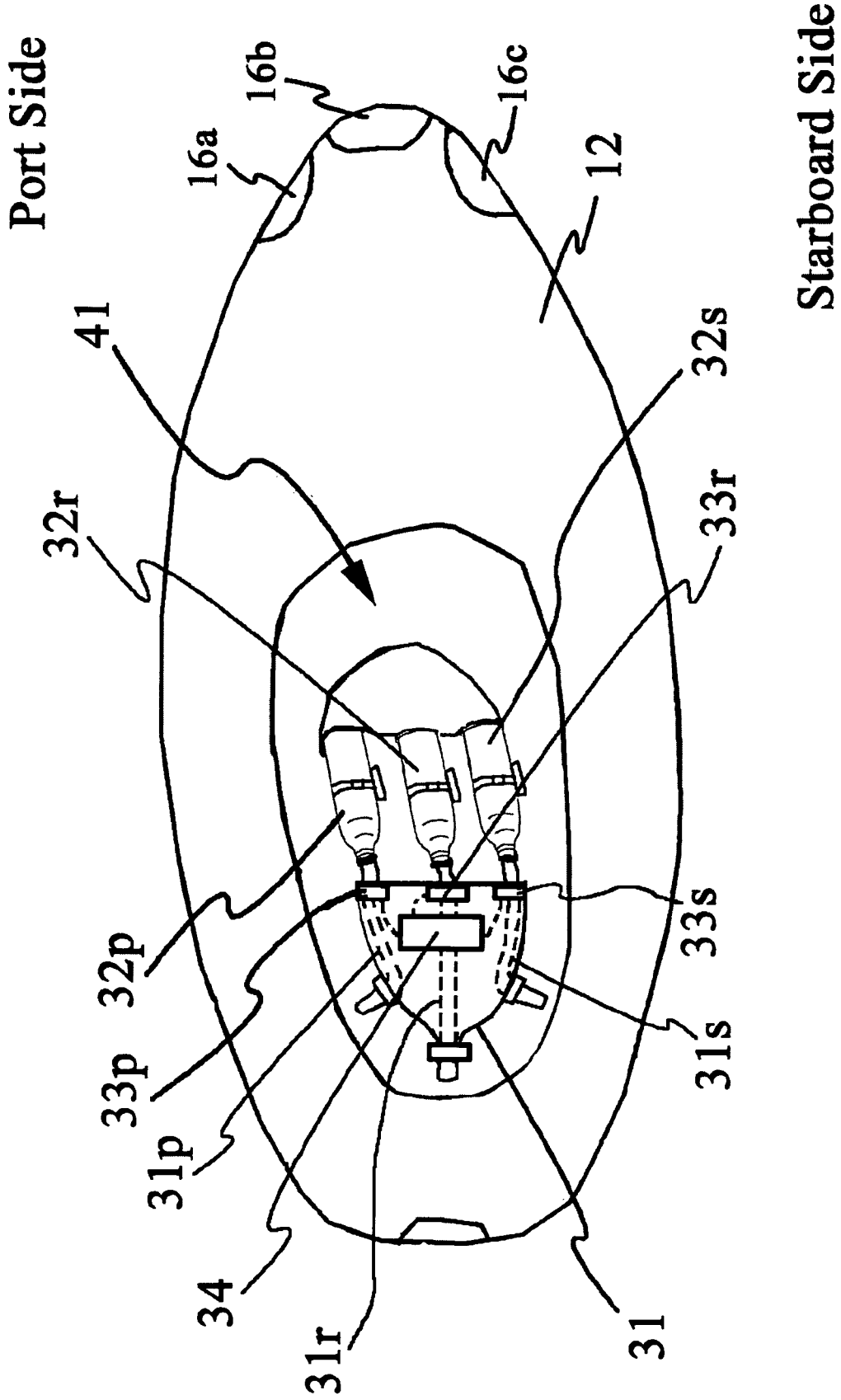
FIG. 4 is a top view of one exemplary embodiment of a water board with a access point hatch removed revealing a propulsion manifold mechanically associated with a substance-source further electrically associated with a controller.

Surfboard (10) further comprises control rudder (26). For the presently preferred embodiment, control rudder (26) is of conventional designed. For one alternative embodiment, control rudder (26) is movably associated with surfboard (10) so that control rudder (26) may be rotated in respect to the bottom of surfboard (10). For such an alternative embodiment, control rudder (26) is mechanically associated with a control motor configured for rotating control rudder (26) so that the distal end (21) points toward the stern (23), the starboard (25) direction, or the port (27) direction. The control motor is electrically associated with, and is in electrical communication with, board controller (34) (FIG. 4). As will be described later, board controller (34) is in electrical communication with a remote module associated with a user.

Surfboard (10) further comprises port (30), port (24fs) (fs=front, starboard) and port (24fp). For one embodiment, such ports provide an output port for a deterrent system. Such deterrent system will be described in more detail later. For yet another alternative embodiment of the invention, any one of ports (30), (24fp) and (24fs) may be configured to provide exhaust ports for a propulsion or booster system described later.

Figure 3:
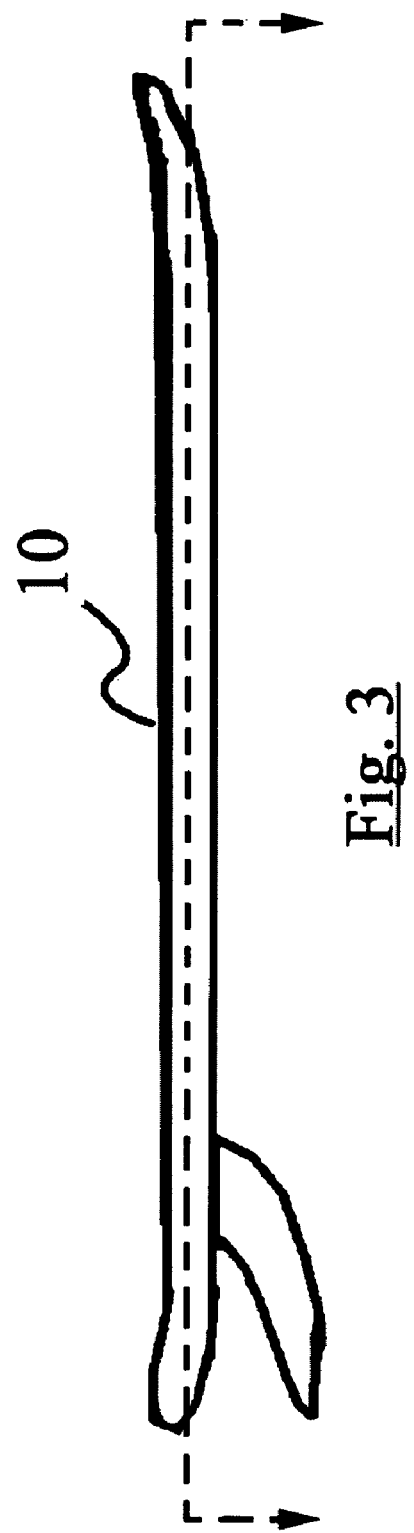
FIG. 3 is a side view of one exemplary embodiment of the water board presented in FIG. 1 and FIG. 2.

FIG. 3 is a side view of the exemplary embodiment of surfboard (10) presented in FIG. 1 and FIG. 2. As depicted in FIG. 1, FIG. 2 and FIG. 3, it should be appreciated that for the presently preferred embodiment of the invention, the physical dimensions of board (10) (length, width, and height) are similar to traditional prior art surf boards.

Referring now to FIG. 4, a top view of the exemplary embodiment of the invention depicted in FIG. 1 with access hatch (14) removed thereby revealing an internal void (41) defined by the surfboard structure (12). Disposed within the internal void (41) is a propulsion manifold (31) mechanically associated with substance-source (32r, rear), (32p, port), and (32s, starboard) via thrust-valves (33r), (33p), and (33s) respectively. The output side of thrust-valve (33r) is mechanically associated with output port (28) via manifold path (31r). The output side of thrust-valve (33p) is mechanically associated with output port (22rp) via manifold path (31p). The output side of thrust-valve (33s) is mechanically associated with output port (20rs) via manifold path (31s).

For the presently preferred embodiment, thrust-valves (33) are flow control components electrically associated with controller (34). Such flow control components comprise an input and an output separated by an electrically controlled valve component. The valve component is configured for receiving control signals from controller (34) and changing its open/closed stated based on such control signals. Such control signals may simply be a power signal supplied to the valve component or, alternatively, a signal received by an onboard valve controller depending on the valve configuration. Exemplarily embodiments of electronic thrust-valves (33) include a magnetic latching valve, a motor driven valve, and electrically controlled solenoid valve.

Thrust-valves (33) may be electronically controlled: (i) close and prevent a substance within substance-source (32) from exiting the substance container, (ii) open and allow a substance within substance-source (32) to exit the substance container and flow into propulsion manifold (31) and out an output port, and (iii) open and allow a substance to be injected into substance-source (32) thereby replenishing/recharging substance-source (32). The electrical association between thrust-valves (33) and controller (34) may be a wired or wireless connection communication and/or power connection.

For one alternative embodiment, thrust-valve (33) may be a one-way valve. For such configuration, thrust-valves (33) comprise a check-valve to prevent reverse flow. Substance-sources (32) are recharged by either replacing substance-sources (32) or removing substance-sources (32) from surfboard (10), recharging/replenishing substance-sources (32), and reinstalling substance-sources (32). Alternatively, the mechanical connection between substance-sources (32) and propulsion manifold (31) may be removed and a recharging/replenishing device mechanically associated with substance-sources (32) allowing substance-source (32) to be recharged/replenished without removing substance-source (32) from surfboard (10).

It should be appreciated that substance-source (32) comprises a container for holding a substance that can be expelled at relatively high speeds to create thrust. One suitable embodiment of a substance-source (32) comprises a container configured for storing a gas under high pressure. For example, substance-source (32) may be a tank or module for housing compressed gases such as air or $CO_2$. Additionally, while the preferred embodiment comprises an independent substance-source (32) for each flow path, alternative embodiments using only one substance-source (32) connected to multiple flow paths fall within the scope and spirit of the present invention.

Figure 5:
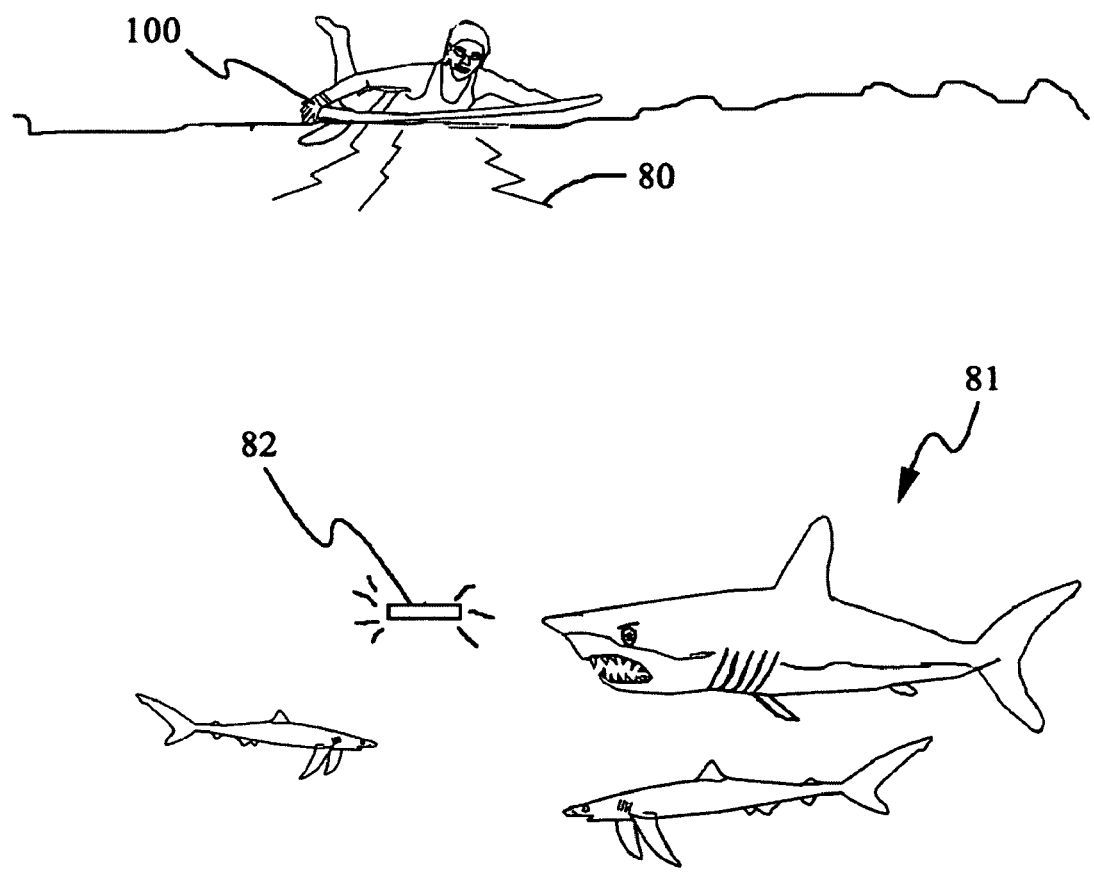
FIG. 5 is a side perspective view of one exemplary embodiment of a user lying on a water board where a deterrent system has been activated.

Attention now is directed FIG. 5 which depicts one exemplary embodiment of the invention that includes a deterrent system. As shown in FIG. 5, a user is lying on one exemplary embodiment of surfboard (10) where the deterrent system has deployed two deterrent devices. The deterrent system depicted in FIG. 5 is configured for confronting sharks although it should be appreciated that any number of deterrent devices maybe deployed for combating any number of eukaryotes. The shark deterrent system preferably deploys at least one a plurality of shark deterrent devices although some embodiments may have only one shark deterrent device.

For the presently preferred embodiment of the invention, surfboard (10) includes a shark deterrent system that may be (a) automatically deployed or (b) deployed in response to a user command. One exemplary automatic deployment system uses a eukaryote sensor that is configured to sense a particular type of eukaryote. For example, the sensor may be a sonar based system that transfers sensor data to controller (34). Such sensor data would suitable for determining the shape of objects in close proximity of board (10). Additionally, target-shapes would be stored in a memory associated with controller (34). If a detected shape is determined to be substantially similar to a target-shape, controller (34) would automatically deploy a deterrent device. Sonar based system for detecting objects in water are well known in the art and a detail description thereof is not necessary for providing an enabling disclosure of this attribute of the invention.

One suitable shark deterrent device is a chemical-dispenser. The chemical-dispenser is mechanically associated with at least one of output ports (22rp), (20rs), (24fp), and (24fs). When the chemical-dispenser is activated, a chemical substance is dispensed through one or more output ports so that a cloud (80) is formed around surfboard (10) and/or the user. For one embodiment, the chemical substance is a broad-spectrum-semiochemical (BSS) mixture comprising a combination of semiochemicals known to be effective for repelling one or more species of sharks. It should be appreciated that other chemical compounds known to be effective for repelling sharks may be used without out departing from the sprit and scope of the present invention.

Another suitable shark deterrent device is a decoy dispenser configured for deploying a passive decoy device or a reactive decoy device (82). A passive decoy device simply diverts the attention of a shark while a reactive decoy device is configured for diverting attention and inflicting injury on a shark.

One embodiment of a reactive decoy (80) is an anti-shark grenade which comprises a waterproof housing with at least one removable cap. For the preferred embodiment, such housing comprises a waterproof tube constructed of lightweight plastic with a removable end-cap associated with each end of the tube. Packed inside the waterproof shell is a water soluble decoy-substance known to attack sharks. The waterproof shell is further associated with a weapon for injuring the shark when the shark attacks the reactive decoy. Without the weapon option, the decoy is a passive decoy.

Suitable decoy-substances include dehydrated blood or synthetic blood compounds. One suitable weapon comprises a plurality of percussion caps containing an explosive charge that explode when the shark attacks the reactive decoy. Certain features of a suitable reactive decoy device are disclosed in U.S. Pat. No. 4,155,186 issued to Robinson (which is incorporated by this reference for all purposes). An alternative weapon would be a chemical based weapon such as a poison (preferably fast acting) known to be deadly to the shark or eukaryote of interest.

For the present embodiment of the inventions, the reactive decoy (80) sinks when released. Additionally, a tether may be used for mechanically associating reactive decoy (80) to surfboard (10) so that reactive decoy (80) sinks to a predefined distance and stops.

For the present embodiment, when the decoy dispenser is activated, the reactive decoy (80) is separated from the end-caps and is ejected or released from surfboard (10). As the reactive decoy sinks, the decoy-substance begins to dissolve attracting the sharks away from surfboard (10). It should be appreciated that deploying a deterrent device and a decoy simultaneously will provide the incentive not to attack a surfboard (10) user while at the same time providing the incentive to attack a remote decoy device.

Figure 6:
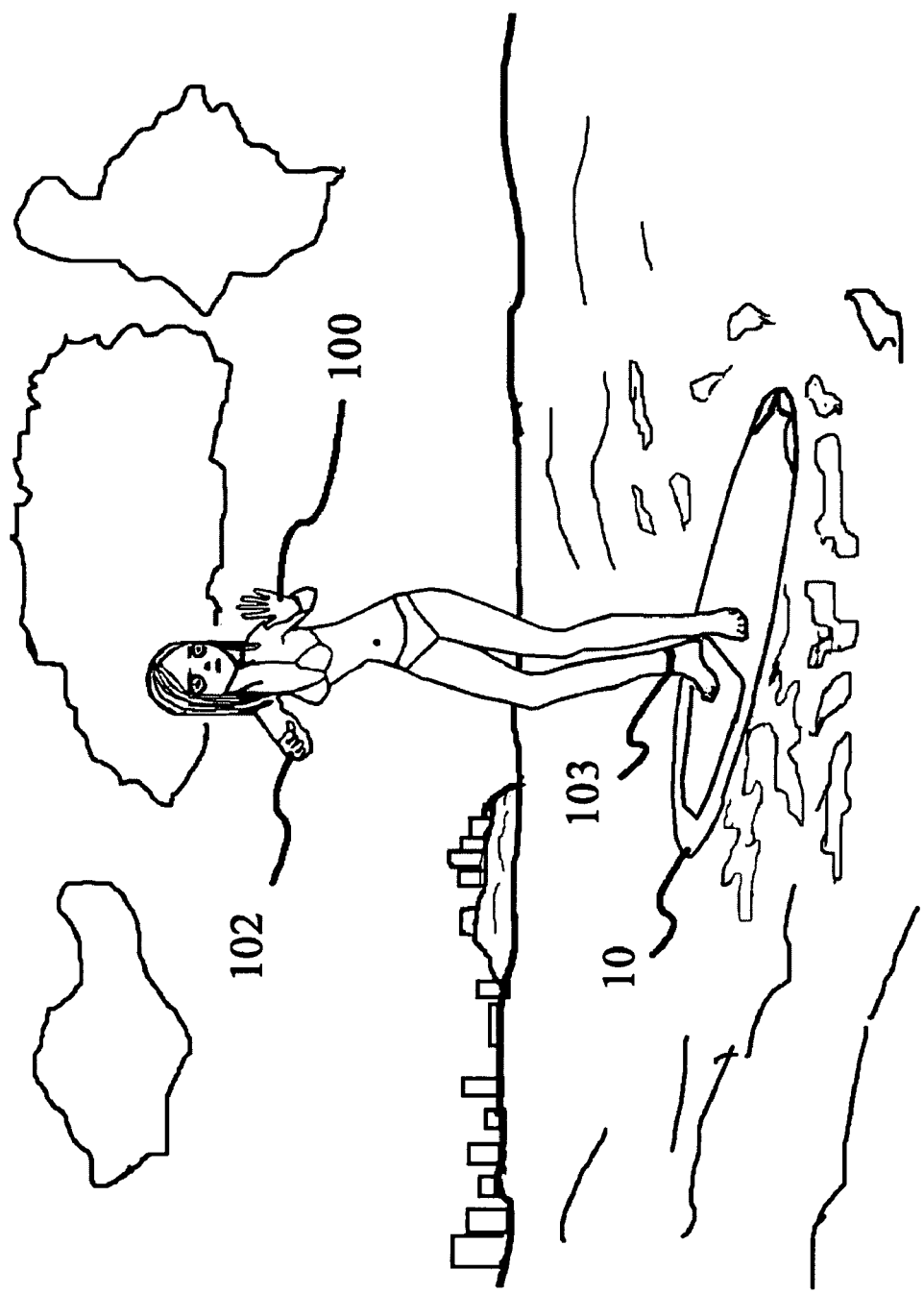
FIG. 6 is a top perspective view of one exemplary embodiment of a user standing on a water board where the user is associated with a wireless controller incorporated into a user module.

Referring now to FIG. 6, a side perspective view of a surfboard according to one exemplary embodiment of the invention is presented with a user standing on the surfboard (10) where the user is associated with a user interface (100). For the presently preferred embodiment, user interface (100) comprises a glove structure associated with an electronic module (112). A second user interface (102) may be associated with the other user's hand. Additionally, the user may be further associated with an ankle strap (103). Such user interfaces and ankle strap devices are configured with wireless technology for remotely controlling surfboard (10) features.

For example, ankle strap (103) may be configured with wireless technology that is in communication with controller (34). The ankle strap (103) transmits a low powered transponder signal that is received by controller (34). Controller (34) may be configured to perform a variety of functions depending on whether or not the transponder signal is present. For example, should a user wearing ankle strap (103) fall off of surfboard (10), the transponder signal would be lost and controller (10) would deactivate/activate a surfboard feature.

Figure 7:
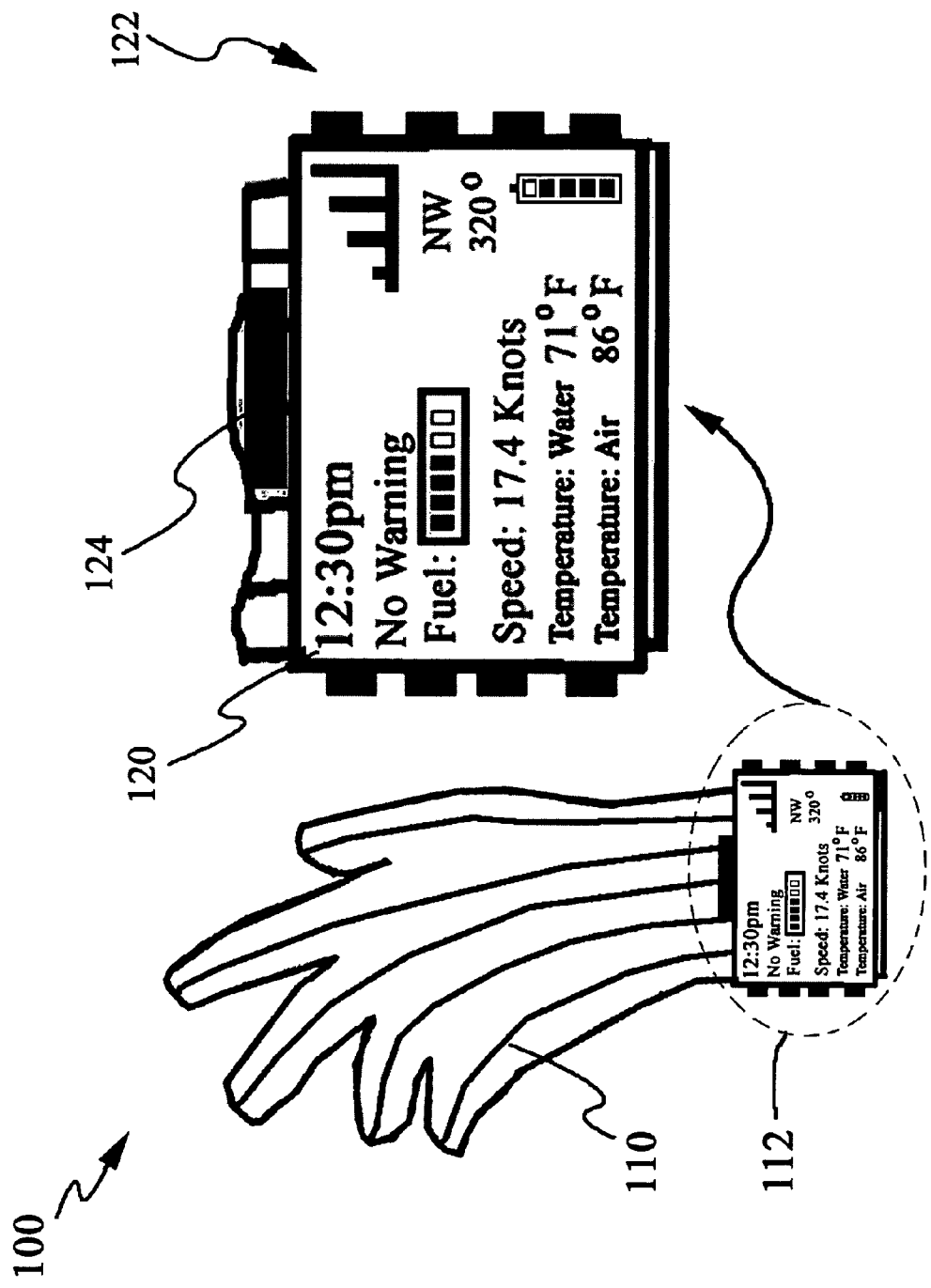
FIG. 7 is a top view of one exemplary embodiment of a wireless controller incorporated into a user module including one exemplary display format.

Referring now to FIG. 7, one exemplary embodiment of a user interface (100) is presented. User interface (100) comprises a glove structure associated with an electronic module (112). Electronic module (112) comprises wireless communication technology for sending and receiving data signals. Electronic module (112) further comprises a user display (120) for displaying information to a user. User display (120) is configured to all any desired user orientation relative to the glove. For example, user display (120) may be rotated so that display (120) has the same orientation as a typical watch.

The preferred power source is a long life lithium battery of capable of powering electronic module (112) for at least ten years. Such an embodiment, electronic module (112) is completely encapsulated in a potting material to prevent moisture from entering the module thereby making electronic module (112) a "throw away" device should the module malfunction or when the power source is depleted. The potting material that covers display (120) would be a transparent potting material.

The electronic features of electronic module (112) are described in more detailer later in this document. It should be appreciated that user interface (100) embodiments that do not include a glove structure fall within the scope of the disclosed inventions. For example, user interface (100) may be a simple handheld controller with push buttons where the handheld controller is in wireless communication with controller 34 as well as other devices.

One exemplary display (120) configuration for presenting the various data a user might wish to review is presented in FIG. 7. Such data includes time data, warning data, fuel level data, battery status data, speed data, temperature data, signal strength data, and direction data. Preferably, such display configuration is user programmable allowing the user to select the data that is to be displayed. The time data may be a current time read out or an elapsed time read out (stop watch) for other time data. The warning data may be any warning that the user module (120) is configured to generated or receive from an external device. Fuel Level data presents information relating to the substance used by the propulsion system. Battery Status data related to the power source associated with user module (112). Speed data is data related to the movement of surfboard (10). Temperature data is data related to the temperature of various objects such as water temperature and air temperature. Signal strength data is data describing the relative strength of a received signal for a remote transmitter whether associated with surfboard (10) or some other device. Direction data provides a user with an indication of the direction the electronic module (112) is pointing. Preferably, electronic module (112) may be configured to continuously update the direction data or only up date upon receiving a user request (to save battery life). Similarly, electronic module (112) may be user configurable to up date the displayed information as desired by a user.

Electronic module (112) further comprises user input points (122) and (124). For the preferred embodiment, user inputs (122) are buttons located on one or more sides of electronic module (112). Such user buttons allow a user to change user display (120) as well as set selected user configurable parameters. User input (124) is a user programmable button that may be configured to perform a specific task(s) whenever user input (124) is activated. For the preferred embodiment, user input (124) is configured as a "panic button" that sends a distress signal when activate as well as causing other surfboard features to activate such as the deterrent system.

User interface (100) is one possible device that may be used for controlling the booster system of surf board (10). For the preferred embodiment, as a user closes her hand, a parameter of one or more control lines (110) changes. For example, the resistive value of control lines (110) changes as control lines (110) are stretched when a user makes a fist. Such changes are sensed by user module (120) and the appropriate booster system control signals are sent to controller (34). Controller (34) generates the necessary control signals to activated one or more thrust-valves (33).

Alternatively, the glove structure may be configured with a control-component that is configured to generate a control signal that is conveyed to electronic module (112). On exemplary embodiment of a control-component is a plunger switch that generates a control signal based on how far the plunger is pressed. Such a control signal may simply be a resistance value.

Controller and User Interface

Figure 8:
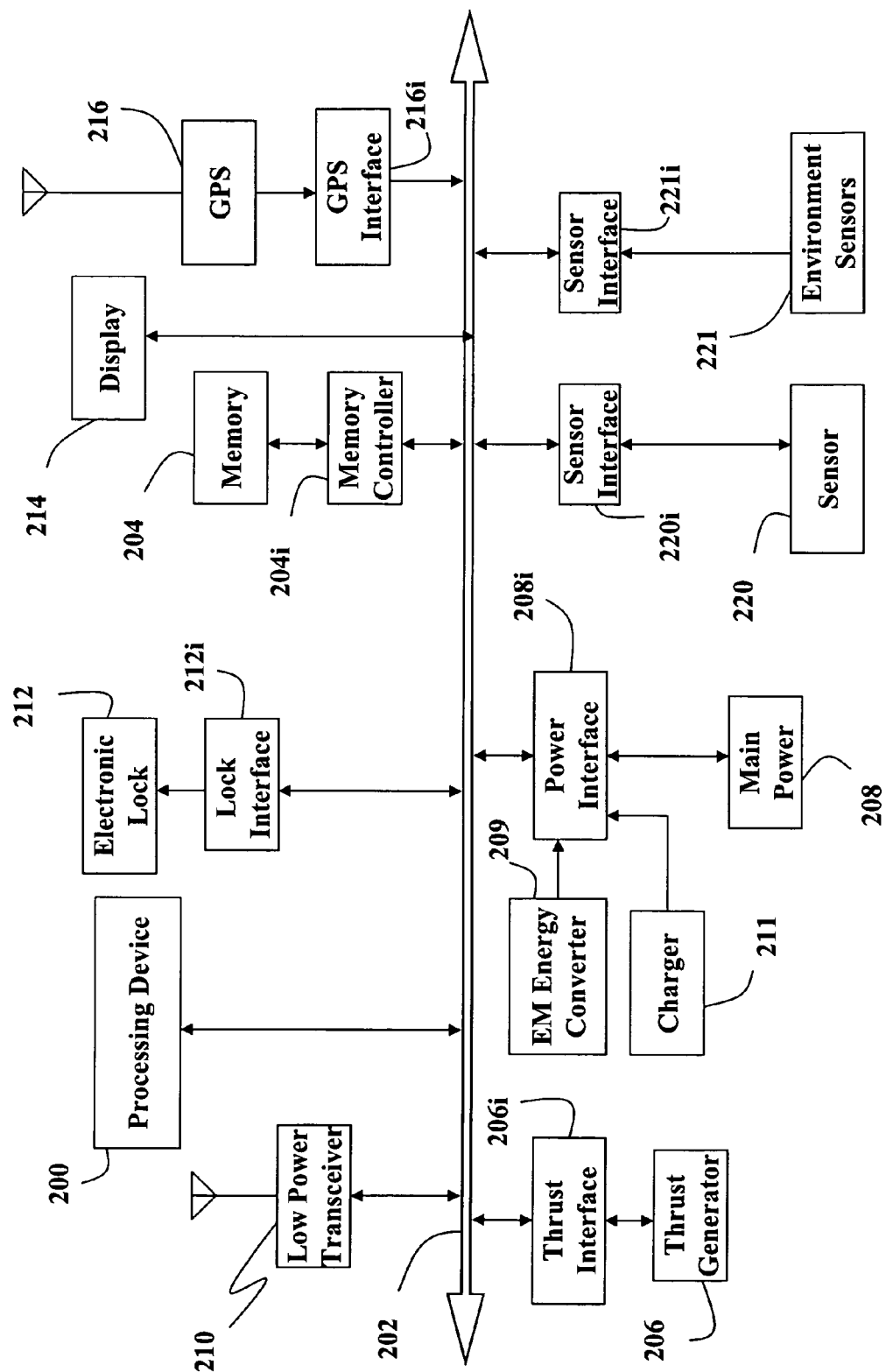
FIG. 8 is a block diagram representation of one exemplary controller configuration.
Figure 9:
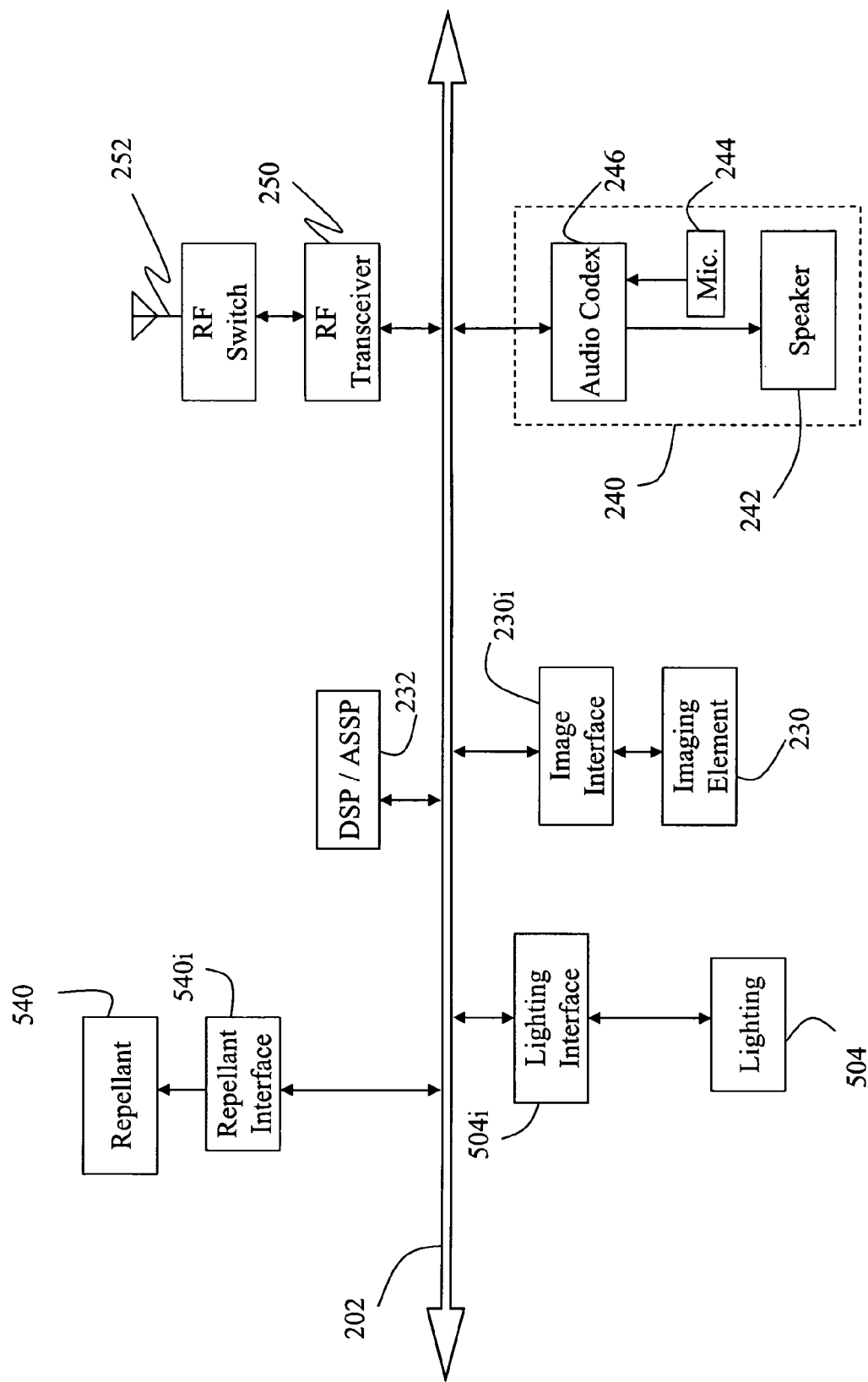
FIG. 9 is a continuation of the block diagram representation of FIG. 8.

Attention will now be directed more specifically to exemplary embodiments of the controller (34) and user interface (100) configurations. Referring now to FIG. 8 and FIG. 9, a block diagram representation of the various electronic components of controller (34) is presented. It should be appreciated that user interface (100) may use the same or substantially similar components. After the components of controller (34) are described, exemplary embodiments of user interface (100) are considered.

Initially it should be appreciated that FIG. 8 presents just one of a plurality of methods of electrically associating the various electronic components to achieve the features desired. For example, FIG. 8 presents the use of a common buss (202) for electrically associating the various components. It should be appreciated that embodiments where certain devices are electrically associated with each other without the use of a buss fall within the scope of the invention. In addition, various embodiments of controller (34) may include all the features presented in FIG. 8, only a subset of subset of such features as well as features not specifically presented in FIG. 8.

Controller

For the presently preferred embodiment, controller (34) comprises either an electronic module integral to surfboard (10) or mechanically associated with surfboard (10). For either such exemplary embodiments, controller (34) is preferably completely encapsulated in a potting material to prevent water contamination. Additionally, any wired connections between controller (34) and external devices are preferably achieved using a non-wicking wiring system.

Additionally, it should be appreciated that many of the electronic components for controller (34) are similarly suitable for user interface (100).

The functional blocks of FIG. 8 represent ASSPs (Application Specific Standard Product), Complex Programmable Logic Devices (CPLD), ASICs (application specific integrated circuit), microprocessors, or PICs. In addition, one or more functional blocks may be integrated into a single device or chip sets such as ASSP chip sets. For example, one or more of the various interfaces described below may be integrated into (or have its described functions performed by) processing device (200).

Manufactures of suitable ASSP devices include Motorola, and Texas Instruments. While most of the functions are preferably performed by ASSP chip sets, Complex Programmable Logic Devices (CPLD) may be used to interface the various ASSP blocks to system buss (202) allowing one system component to interface with another component. Manufactures of suitable CPLD devices include Lattice's (ispMACH 4000 family) and (Altera's MAX 7000-series CPLD).

For the presently preferred embodiment of the invention, processing device (200) is configured to for controlling the various system of surfboard (10) including the data management system, communication system, power management system, deterrent system, propulsion system, lighting system, environmental and user sensor systems, imaging/sound system, anti-theft system, and entertainment system. Processing device (200) may be a simple PIC (such as the ones manufactured by MicroChip) or a relatively more complicated processor configured for use with standard operating systems and application software. Other technologies that may be used include ASICs (application specific integrated circuit) and ASSPs (application specific standard product). Processing device (200) may comprise onboard ROM, RAM, EPROM type memories.

Processing device (200) is electrically associated with buss (202). Buss (202) is configured for providing a communication path between the various electronic devices electrically associated with buss (202). For example, Buss (202) is configured for transferring data signals between processing device (200) and other electronic devices electrically associated with buss (202). For the preferred embodiment, bus (202) also comprises electrical paths for transferring power between main power (208), EM energy converter (209), charger (211) and other electronic devices electrically associated with buss (202). Buss (202) may further comprise a data port and or a power port configured for supplying/receiving power or providing a communication path to electronic devices electrically associated with such port.

Memory (204) is electrically associated with buss (202) via memory controller (204i). Memory (204) may be any type of memory suitable for storing data such as flash memory, SRAM memory, hard drive memory, as well as other types of memories. Volatile memory continuously connected to a power source may be used, although, for the preferred embodiment, memory (204) is nonvolatile memory. Memory (204) may be used for storing all types of data including application programs, image data, sound data, customer information, sensor data, and warning-criteria. Memory (204) is electrically associated with processing device (200) via memory controller (204i) and buss (202).

DSP/ASSP (232, FIG. 8) is electrically associated to processing device (200) via buss (202). DSP (232) is configured to perform signal processing tasks such as voice, audio, video, encoding, decoding as well as other data and signal processing functions. DSP/ASSP technologies are well known in the art and a detailed description thereof is not necessary to provide an enabling description of the present invention.

Display (214) is configured for displaying the various system data received or generated by controller (34). Display (214) is electrically associated with buss (202) and may include technology for providing a customizable touch screen controller configured for control and decoding functions for display (214). For the preferred embodiment display (214) is a LCD display. Additionally, for one embodiment, display (214) comprises a "memory" configured to provide an image when power is removed from the display. For this embodiment, an image is written on the LCD display and when power is removed, the display will retain the image virtually indefinitely. Such a LCD display uses a technique developed by Zenithal Bistable Devices (ZBD), which adds a finely ridged grating to the inner glass surface of an LCD cell of Super-Twist-Nematic (STN) construction. As is known in the art the presence of the grating "latches" the polarization state of the liquid crystals and retains it when power is removed. Preferably, hatch (14) comprises display-section that is at least partially transparent to allow viewing of display (214) without removing the hatch. Alternatively, controller (34) may be disposed within hatch (14) Controller (34) may further comprise a graphics accelerator that provides support for mega-pixel cameras and 3D graphics applications. One suitable graphics accelerator is the MQ2100 manufactured by MediaQ. For such a configuration, an imaging device (describe later) associated with board (10) or the board user may be used to record images that are stored in memory (204) and displayed on display (214) upon user request.

For the presently preferred embodiment, thrust generator (206) is electrically associated with processing device (200) through thrust interface (206i). For the presently preferred embodiment, thrust generator (206) comprises propulsion manifold (31), substance-source (32), and thrust-valves (33). Processing device (200) is configured to receive propulsion control signals from user interface (100). Upon receiving such propulsion control signals, processing device (200) generates the corresponding control signals that are transferred to thrust interface (206i) which selectively activates the appropriate thrust-valves to generate the desired thrust. Alternatively, the signals received from user interface (100) may be directly routed to thrust interface (206i).

Exemplary communication circuitry is now considered. For one embodiment, relatively long range wireless communication circuitry includes RF transceiver (250) electrically associated with antenna (252). RF Transceiver (250) is configured to transmit and receive data signals to/from a remote electronic device. It should be noted that embodiments where such communication circuitry comprises only a transmitter or only a receiver fall within the scope of the invention. For one embodiment, transceiver (250) comprises a relatively low power transmitter that transmits a data signal in an unlicensed frequency band. Other embodiments include a relatively longer range transmitter comprising any number of well known technologies for wireless communications transmitting at any legal power level. For example, transceiver (250) may be configured to communicate over GPRS, GSM, GPRS, 3G, and EDGE enabled networks as well as WAP networks.

To facilitate remote access to controller (34) a networking system, such as a local area network (LAN) may be utilized. In this presently preferred embodiment, processing device (200) and memory (204) are configured to form a TCP/IP protocol suite and an HTTP (HyperText Transfer Protocol) server to provide two-way access to the surfboard (10) data. Such TCP/IP protocols and HTTP server technology are well known in the art. For such an embodiment, user controller (34) include an HTTP server and a TCP/IP protocol stack. A gateway is provided that enables continuous remote access to the controller (34).

Generally speaking, a gateway may simply be a means for connecting two already compatible systems. Alternatively, a gateway may be a means for connecting two otherwise incompatible computer systems. For such an alternative configuration, the TCP/IP protocol suite may be incorporated into a gateway serving multiple controller (34) devices via a wired or wireless two-way network using, for example, Wireless Fidelity (Wi-Fi) technology. Such a gateway may incorporate an HTTP server for accessing data from multiple controller (34) devices and for transmission of data to individual user interface (10) devices.

In the above described TCP/IP enabled controller (34) system, a remote transceiver provides access to a first network operating in accordance with a predetermined protocol (TCP/IP is one example). A plurality of controller (34) devices may comprise a second network, such as a LAN. A gateway operatively couples the first network to the second network. Finally, an HTTP server is embedded in either the gateway or the plurality of user interface (100) devices facilitating the transfer of data between the two networks. With such a configuration, one of ordinary skill in the art will appreciate that individual controller (34) device or groups of controller (34) devices may be accessed as if the controller (34) devices were a web site and their information could be displayed on a web browser.

Controller (34) may further be configured for storing and/or generating location data. For embodiments that generate location data, controller (34) includes a position-finder such as GPS device (216) electrically associated with processing device (200) via buss (202) and GSP Interface (216i). GPS (216) is one embodiment of a position-finder electrically associated with a processing device where GPS (216) is configured to generate position-data for the location of controller (34). Alternative embodiments include controller (34) configurations that do not include a GPS but instead received location data from an external device such as user interface (100).

Processing device (200) is configured to use such position-data for providing anti-theft services and mapping services. For the anti-theft configuration, a user places surfboard (10) in a location to be stored. The user then activates the anti-theft system. In response, processing device (200) records current position data. Next processing device (200) monitors the surfboard for motion by: (1) monitoring the output of a motion sensor configured to detect motion; or (2) periodically (at set intervals, random intervals, or upon remote request) access GPS (216) and retrieves real-time position-data and compares the real-time position-data to the stored position-data. If the difference between the two sets of position-data is outside a predefined user threshold, controller (34) causes an alert signal to be transmitter to a remote device such as user interface (100). Controller (34) may further start recording image data and sound data that is transmitted to a remote device. An alert signal may include location data, image data, sound data and any other system data as predefined by the user or board manufacturer.

Alternatively, controller (24) may be configured to transmit at data signal a predefined time intervals. Such data signal may include location data. A device receiving such data signal, such as user interface (100), may monitor the location data from two or more different data signals to determine if movement has occurred. A user may then use user interface (100) to perform any of a plurality of actions including: retrieving image data from board (10), retrieving sound data from board (10), transmitting a lock signal to board (10), and transmitting a sound signal to board (10). For example, a user could use user interface (100) to transmit the following sound message that is played by board (10): "Please put my board back where you found it."

The attributes of exemplary main power (208) are now considered. For the presently preferred embodiment, main power (208) is a long life depletable power source such as a Li Ion battery. For such embodiment, main power (208) comprises at least one long life rechargeable Li Ion battery such as the ones manufactured by A123 Systems®.

Extending the life of main power (208) or extending the time between recharging is one design concern addressed by power interface (208i). Power Interface (208i) is configured to perform power management functions for the system as well as monitor the status of main power (208) and report such status to devices electrically associated with buss (202) (such as processing device (200), user interface (100), etc.). Power interface (208i) dynamically addresses power management issues by selectively powering down unutilized devices. For the Preferred embodiment, power interface (208i) is a CPLD that generates chip-select signals and powers down the various ASSPs as desired. Alternatively, processing device (200) may perform such power management functions.

Electronic lock (212) is electrically associated with processing device (200) through lock interface (212i) and buss (202). For this embodiment, lock interface (212i) is an ASSP or CPLD device configured to change the state of electronic lock (212) in response to control signals received from processing device (200). Similarly, lock interface (212i) may be further configured to communicate the status of electronic lock (212) to devices electrically associated with buss (202). Electronic lock (212) may be a software lock that prevents access to various functions provided by controller (34)/user interface (100). In addition, electronic lock (212) may further be a mechanical lock that provides a location for attaching a restraining device such as a chain.

Imaging element (230) is electrically associated with processing device (200) through image interface (230i) and buss (202). Imaging element (230) and image interface (230i) are configured for acquiring and transferring images to electronic devices electrically associated with buss (202). For the preferred embodiment, imaging interface (230i) is configured to support CMOS image input sensors such as the one manufactured by Micron® and/or CCD (charge-coupled device) image input sensors such as the ones manufactured by ATMEL® sensors. Imaging interface (230i) performs the necessary processing functions to convert the imaging data into a desired format before transferring such data to other devices associated with buss (202). Both Board (10) may be configured with an imaging element (230) for recording surfing activities (as well as other activities). Such image data is formatted and stored in memory (204) for later use.

Low Power transceiver (210) would typically comprise a low power transmitter relative to transceiver (250). For the embodiment in FIG. 8, low power transceiver (210) operates in an unlicensed band although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band.

Such technologies are known and understood by those skilled in the art, and a detailed explanation thereof is not necessary for purposes of describing the method and system according to the present invention. Low power transceiver (210) is configured for short range communication with other suitably configured devices.

Attention now is directed to audio module (240). For the preferred embodiment, audio module (240) comprises sound transducer (242) and microphone (244) electrically associated with audio codex (246). Audio module (240) is configured for detecting sound waves and converting such waves into digital data of a predefined format such as MP3. Sound waves may also be generated by audio module (240) using sound transducer (232) to issue warnings and provide for other forms of communications. For example, audio module (24) may be used for voice communications between a person located at controller (34)/user interface (100) and a person located at a remote site, using, for example, VoIP for the IP enabled systems describe earlier. Audio module (240) may also be used to play MP3 files stored in memory (204) or via streaming data over a communication connection.

EM (electromagnetic) Energy Converter (209) is electrically associated with power interface (208i) and mechanically associated with the top of surfboard (10). EM Energy Converter (209) is configured to convert electromagnetic energy (such as a radiated RF signal from a man made transmitter, sunlight, etc.) into a voltage for supplying power to system components and/or supplying energy to a power source. One well known EM Energy Converter is a photovoltaic cell. Such technologies are well known in the art.

Similarly, a charger (211) may be electrically associated with power interface (208i) via a direct connection or via buss (202). Conger (211) is suitably configured for recharging main power 208 as well as providing power to controller (34).

As noted previously, embodiments of surfboard (10) may includes deterrent system that may be (a) automatically deployed or (b) deployed in response to a user. Preferably, the deterrent system is particularly suitable for addressing sharks. One exemplary automatic deterrent system uses a eukaryote sensor that is configured to sense a particular type of animal. For example, the sensor may be a sonar based system that transfers sensor data to controller (34). Such sensor data would suitable for determining the shape of objects in close proximity of board (10). Additionally, sample-shapes would be stored in a memory associated with controller (34). If a detected animal shape is determined to be substantially similar to a sample-shape, controller (34) would automatically deploy a deterrent device. Sonar based system for detecting objects in water are well known in the art and a detail description thereof is not necessary for providing an enabling disclosure of this attribute of the invention.

Repellant system (540) is configure dispense a deterrent device upon command of repellant interface (540i). One suitable deterrent device is a chemical-dispenser. For this example, the animal of interest is a shark. The chemical-dispenser (540) is mechanically associated with at least one of output ports (22rp), (20rs), (24fp), and (24fs). When controller (34) detects an animal having a shape corresponding to a sample-shape, controller (34) generates deployment signals that are transferred to repellant interface (540i) which in turn causes repellant system (540) to deploy a chemical. When the chemical-dispenser (540) is activated, a chemical substance is dispensed through one or more output ports so that a cloud (80) is formed around surfboard (10) and/or the user. It should be appreciated that a user may manually activate repellant system (540) when desired.

For one embodiment, the chemical substance is a broad-spectrum-semiochemical (BSS) mixture comprising a combination of semiochemicals known to be effective for repelling one or more species of sharks. It should be appreciated that other chemical compounds known to be effective for repelling sharks may be used without out departing from the sprit and scope of the present invention. As described previously, other deterrent devices may be deployed in a similar manner.

Lighting device (504) comprises lighting modules 16a, 16b, 16c, and 16d. Any number of lighting modules may be used. Preferably, lighting devices (504) are configured to be removably associated with board (10) and include their own power source which may or may not be configured for receiving power from main power (208).

Sensors (220) and Environment Sensors (221) may be any number of devices configured to detect any number of parameters related to board (10), a user, and board (10)/user environment. Environment sensors (221) include sonar, User Interface For the preferred embodiment, user interface (100) is configured using identical or similar technology to the technology described above for controller (34). User interface (100) may comprise devices similar or identical to any of the following (depending on the desired functionality): a processing device (200), main power (208), memory (204), display (120), RF transceiver (250), low power transceiver (210), GPS (216), DSP (232), imaging element (230), audio element (240), EM energy converter (209), and a charger (211) all electrically associated together through a buss such as bus (202).

It will be appreciated that while some embodiments of user interface (100) may be specifically configured for use with surf boards (10), other embodiments of user interface (100) may be configured to control a variety of powered riding apparatus' configured with electronic controls. Such devices include powered skate boards and other devices with wheels and powered by motors or other types of propulsion systems where the user needs a wireless communication connection for transferring control signals to the powered device. For example, where the powered device is a motorized skate board, thrust generator (206) becomes the motor and user interface (100) controls the output power of such motor.

User interface (100) may further comprise a biometric sensor. Such a Biometric sensor is used as a "key" to access controller (34)/user interface (100) functions such as the previously described electronic lock. Biometric identification refers to the automatic identification of a person based on his/her physiological or behavioral characteristics. A biometric system is essentially a pattern recognition system which makes a personal identification by determining the authenticity of a specific physiological or behavioral characteristic possessed by a user. The biometric system may include, for example, a handwriting recognition system, a voice recognition system and fingerprint recognition.

For the preferred embodiment of the invention, the sensor (220) includes a fingerprint scanner. For such embodiment of the invention, a user initially places a finger on biometric sensor (220). The biometric sensor scans the finger and transfers a digital representation of the user's fingerprint to memory (204). Such an initial bio sample is called an enrollment sample. After an enrollment sample has been stored in memory, future user controller (34)/interface (100) actions are authorized by comparing a user's real time fingerprint scan to the enrollment sample.

Display (120) is preferably an LCD display similar or identical to that described for display (214), although any suitable technology may be used.

As noted above and depicted in FIG. 7, one embodiment of user interface (100) comprises electronic module (112). Preferably, electronic module (112) is completely encapsulated in a potting material to prevent moisture from entering the module thereby making electronic module (112) a "throw away" device should the module malfunction or when the power source is depleted. Alternatively, the power source for module (112) may be inductively charged requiring no direct electrically connections. The potting material that covers display (120) would be a transparent potting material.

As depicted in FIG. 7, user interface (100) is associated with a glove device configured for generating control signals used use by module (112) to generate the control signals that are transferred to thrust generator (206) to selectively activate the thrust generator as previously described above. It should be appreciated that other means of generating control signals may be used in place of such glove configuration. For example, a simple push button device may be electrically associated with module (112) for generating such control signals. As noted previously, for the embodiment depicted in FIG. 7, as a user closes her hand, a parameter of one or more control lines (110) changes. For example, control lines (110) form an electrical circuit. Module (112) applies a voltage to control lines (110) and measures the resulting current. When the control lines are stretched by closing the hand and making a fist, the resistive value of control lines (110) changes and such changes are detected by module (112). Module (112) detects the resistance changes of control lines (110) and generates the appropriate control signals.

Alternatively, control lines (110) may be strings/cables/wires that pull on sensors within module (112). Such changes are sensed by user module (120) and the appropriate booster system control signals are sent to controller (34). Controller (34) generates the necessary control signals to activated one or more thrust-valves (33).

As previously described, one exemplary display (120) configuration for presenting the various data a user might wish to review is presented in FIG. 7. Such data includes time data, warning data, fuel level data, battery status data, speed data, temperature data, signal strength data, and direction data. Preferably, such display configuration is user programmable allowing the user to select the data that is to be displayed. The time data may be a current time read out or an elapsed time read out (stop watch) for other time data. The warning data may be any warning that the user module (120) is configured to generated or receive from an external device. Fuel Level data presents information relating to the substance used by the propulsion system. Battery Status data related to the power source associated with user module (112). Speed data is data related to the movement of surfboard (10). Temperature data is data related to the temperature of various objects such as water temperature and air temperature. Signal strength data is data describing the relative strength of a received signal for a remote transmitter whether associated with surfboard (10) or some other device. Direction data provides a user with an indication of the direction the electronic module (112) is pointing. Preferably, electronic module (112) may be configured to continuously update the direction data or only up date upon receiving a user request (to save battery life). Similarly, electronic module (112) may be user configurable to up date the displayed information as desired by a user.

Wave Information System and Smart Buoy

Figure 10:
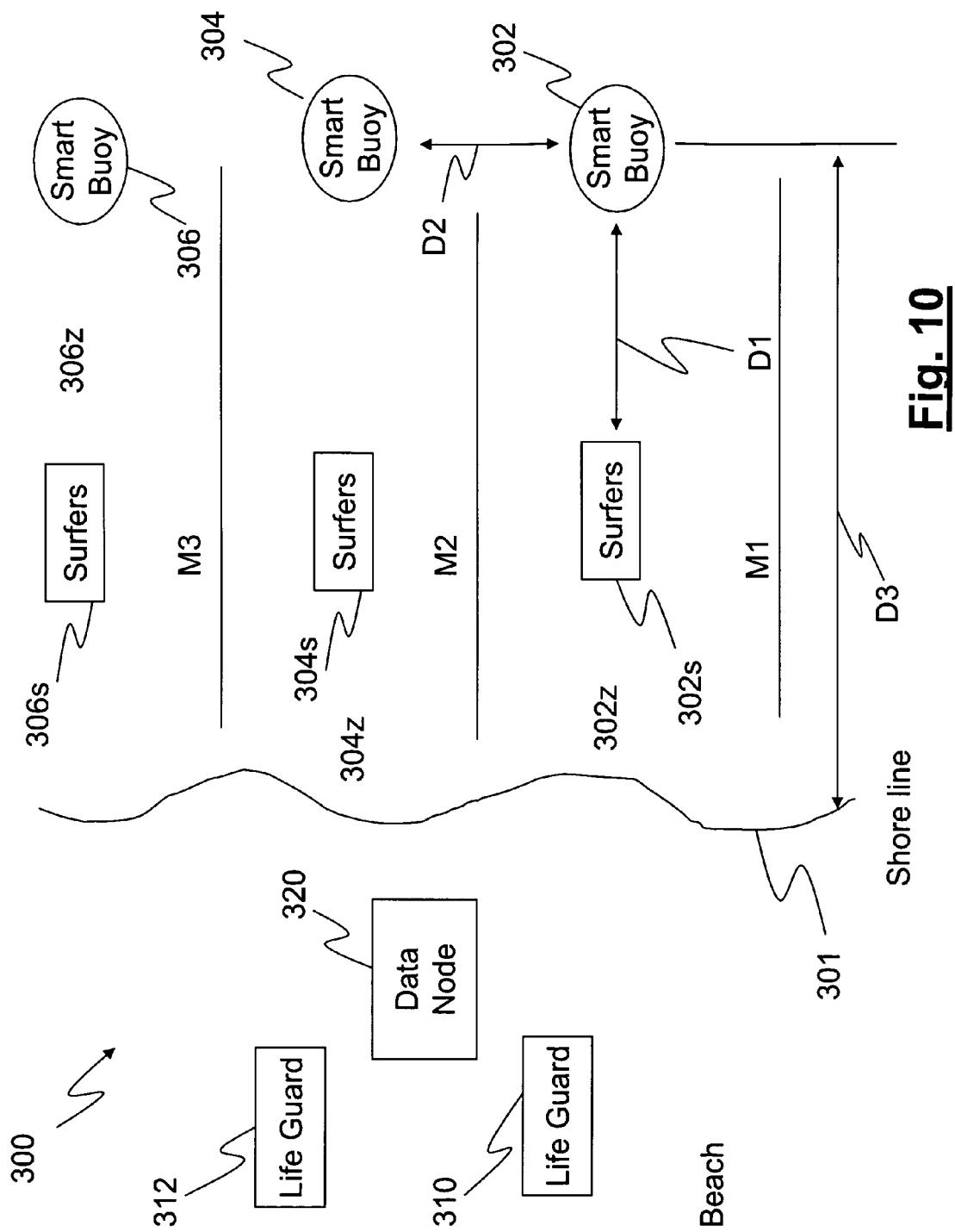
FIG. 10 is a representation of one exemplary wave information system.

In addition to the above data, one embodiment of user interface (100) is configured to receive data from an external data source. One such external data source is the wave information system (300) depicted in FIG. 10. One exemplary wave information system (300) is presented in FIG. 10 comprising at least one smart buoy (302).

Smart buoy (302) comprises an electronic buoy module configured for detecting a plurality of water/wave parameters and transmitting data related to such information to a remote location. For the embodiment shown in FIG. 10, there are three smart buoys disposed a distance D2 apart along a parallel path relative to shore line (301) at a distance D3 from the shore line (301). Similarly, smart buoy devices may be disposed along a perpendicular path relative to shore line (301) as well as random placements. Each buoy is configured to sense/detect a predefined set of water/environment parameters and transmit a data signal communicating such parameters to remote devices. For example, smart buoy (302) may be configured to sense water parameters such as wave conditions that will eventually propagate through zone (302z). Surfers (302s) and life guard (310) may have embodiments of user interface (100) (with or without the glove) configured to receive transmissions from smart buoy (302). Such information may be used by surfers (302s) to catch a set of waves, catch a particular wave, or avoid a set of waves. Life guard (310) may use information received from buoy (302) to improve beach safety.

Before considering the smart buoy configurations, it may be help to first consider wave dynamics. Looking out at the water, an ocean wave in deep water may appear to be a massive moving object—a wall of water traveling across the sea surface. But in fact the water is not moving along with the wave. The surface of the water—and anything floating atop it, like a boat or buoy—simply bobs up and down, moving in a circular, rise-and-fall pattern. In a wave, it is the disturbance and its associated energy that travel from place to place, not the ocean water. An ocean wave is therefore a flow of energy, traveling from its source to its eventual break-up. This break up may occur out in the middle of the ocean, or near the coast in the surf zone (such as 304z).

Figure 11:
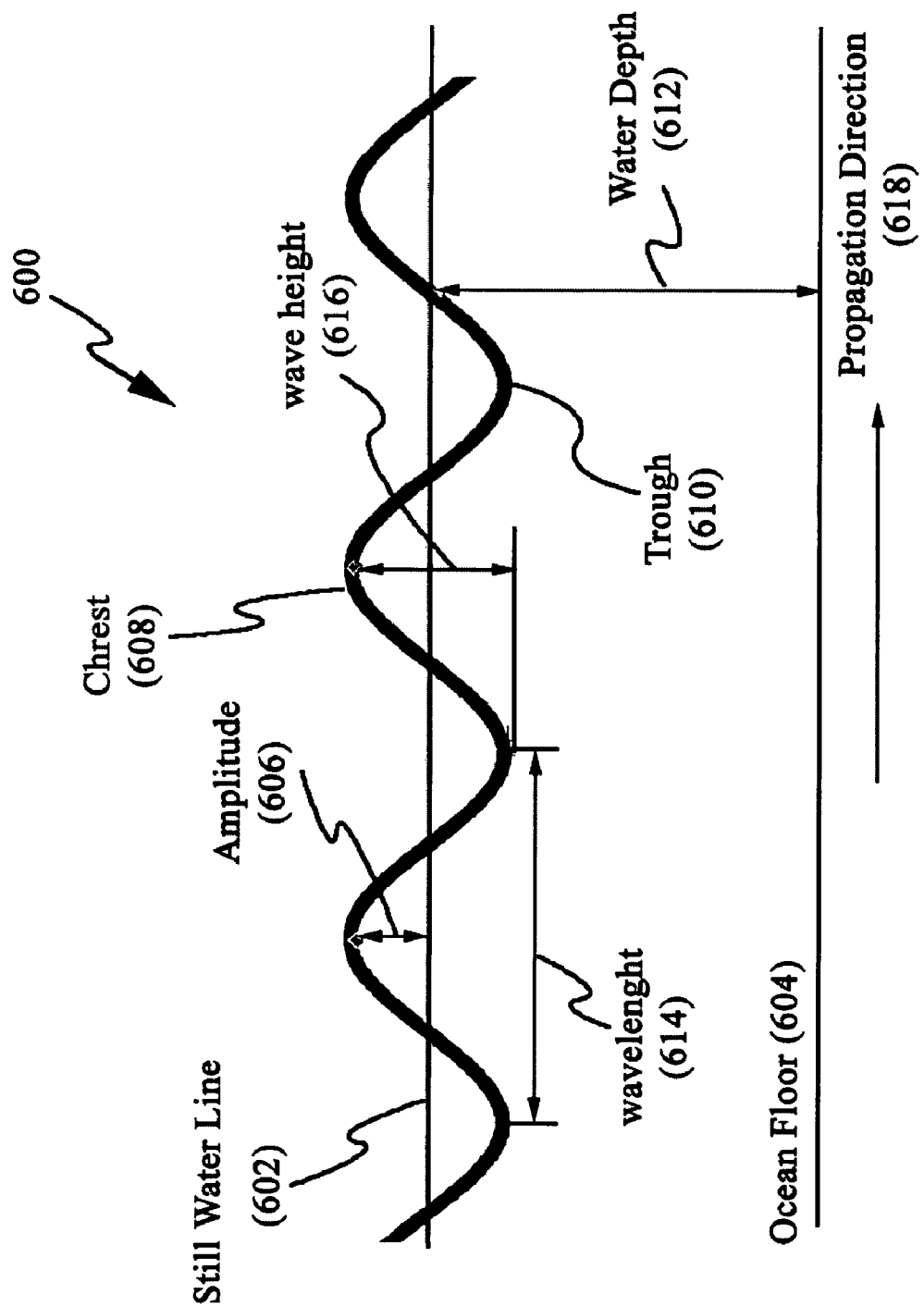
FIG. 11 is a diagram of various wave parameters.

Referring now to FIG. 11, Smart Buoy configurations are now considered. Buoy modules configured for detecting/determining wave parameters are know in the art and include system National Oceanic and Atmospheric Administration (NOAA) and Scripps/CDIP systems. In addition, custom designs may be employed where such designs are configured to minimize cost and power consumption. Such a buoy module is associated with a buoy and configured to detect/sense/calculate at least one of the following parameters: water line (602), wave amplitude (606), wave crest (608), wave height (616), trough (610), water depth (612), wave length (614), and propagation direction. Buoys configured to perform such measurements are known in the art and a detailed description is not necessary for the purposes of providing an enabling description of the present invention. Smart buoy (302), (304), and (306) comprise a buoy module electrically associated with a buoy controller (350). Buoy controller (350) comprises one or more of the following components as described above (or similar components): processing device (200), main power (208), memory (204), display (120), RF transceiver (250), low power transceiver (210), GPS (216), DSP (232), imaging element (230), audio element (240), EM energy converter (209), and a charger (211) all electrically associated together via a buss.

Smart buoy (302), (304), and (306) and configured to transmit a wave-information data signal in a compatible format so that user interface (100) and/or data node (320) or any similarly configured devices authorized to receive such signals can receive and use the data contained in the wave-information data signal. Such wave-information data signal may comprise any of the following: access code, buoy location data, wave height, wave time stamp, current time, wave speed, water temperature, wind speed, humidity, sun intensity, barometric pressure, as well as any of the wave parameters previously described. The wave time stamp is simply a time stamp for the recorded data indicating when the data was recorded. The current time data is the current buoy time which may be used by other devices to synchronize the relative timing devices or generate a time offset so that "buoy time" can be related to "user time" (for example, user time is the current time for the user interface (100). For example, "buoy time" may be 12:00.30 pm and "user time" may be 12:03.40 pm. For such times, the time offset would be 2 minutes and 10 seconds (2.10).

The receiving device (e.g. user interface (100)) receives the wave-information data signal which may be presented to a user and/or used to generate additional data. One calculated value is a wave Estimated Time of Arrival (ETA) value. For wave ETA data, the user interface uses the following wave-information data: time stamp, wave speed, buoy time value, and buoy location data. User interface (100) determines the time offset if any. Next, user interface (100) determines its location data and uses the buoy location data to determine the distance between the buoy and user interface (100). User interface (100) then uses the wave speed data to calculate an ETA value. User interface (100) may be configured to display a series of waves in a graphical format along with each wave's associated ETA information as well as other wave parameters.

User interface (100) is also configured to detect a predefined "clean up" wave set. A "clean up" wave set is potentially dangerous condition where a surfer may be unaware of multiple waves propagating toward the surfer in a back to back sequence. If such a surfer tries to surf the first wave of a clean up wave set, such surfer may be severely injured/drowned. User Interface (100) is configured to detect a predefined number of waves with predefined wave parameters and defined such wave set as a clean up wave set and warns a user. Alternatively, the smart buoy may be configured to issue "clean up wave set" warnings.

Smart buoy (302), (304), and (306) may be further configured with sensors such as sonar for detecting various types of fish. For example, smart buoy (302), (304) and (306) may be configured with the stored sonar profile data and/or image profile data for a particular fish, (e.g. shark). When a smart buoy detects the sonar profile of a fish, the smart buoy compares the real time sonar profile with the stored sonar profile. If there is a match, the buoy issues a shark warning. In addition, the smart buoy may then take image data (if equipped with imaging elements described above) of the item detected. Such smart buoy then uses image recognition software to compare the real time image with stored image data. If the two images meet predefined comparison criteria, a shark warning is issued. Suitable image recognition software includes well known facial recognition software as well as software specifically configured for animal recognition.

In addition to detecting animals such as sharks, smart buoy may be further configured to detect schools of fish. For such configuration, smart buoy periodically scans for any items under the surface of the water. When items are detected a digital representation of such sonar image is stored in memory and/or processed to determine the number and size of such fish along with a time stamp.

It will be appreciated that a smart buoy may be configured to receive and retransmit a data-signal transmitted from other smart buoys. Such a configuration allows a chain of smart buoys to be disposed in a body of water to extend the range of such a system. For such a system the range is limited only by the number of buoys deployed.

In addition to user interface (100) receiving a smart buoy data signal, data node (320) is configured for receiving a smart buoy data signal. Date node (320) is further configured to retransmit such data to a remote location via a wired or wireless communication connection. Preferably, data node (320) is connected to an external network via (e.g. internet) via a wired connection. The information received by data node (320) is then transferred to a website where anyone with access rights can view such smart buoy information including: image data, wave data, temperature data, sound data, fish data (i.e. detection of schools of fish) or any other data generated by a smart buoy.

Such website data preferably contains real time and historical data. Historical data comprises old data that may be generated using statistical theories to provide a better understanding of real time data. For example, real time fish data may be associated with historical fish data to generate a data confidence value.

One user of such a system may be owners of fishing boats that charter their boats to people wishing to fish. Such owners would purchase rights to the website to view fish sighting data. Using such data, the fishing boat can better determine what fishing spots are more likely to provide better fishing.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A water board apparatus for riding waves, said apparatus comprising:
    a board structure having the general shape and size of a traditional surfboard, comprising a top portion and an opposing bottom portion, wherein said top portion comprises a hatch movably associated with said board for allowing access to an internal void defined between said top portion and said bottom portion;
    at least one output port position generally at the rear of said board structure and extending from said void through said bottom portion;
    a controller disposed within said void, said controller comprising a processing device electrically associated with a memory and a receiver and a power source;
    a substance-source disposed within said void and mechanically associated with said output port through a flow path wherein said substance-source comprises a container filled with a pressurized substance;
    a thrust-valve disposed between said substance-source and said output port and electrically associated with said controller, wherein said thrust-valve is configured to open and close in response to valve-control-signals received from the controller thereby selectively allowing and preventing the release of said pressurized substance from said substance-source through said output port;
    a user interface module separate from said water board apparatus and configured for being associated with a water board apparatus operator, said user interface module in wireless communication with said controller and configured to generate and transmit thrust-control-signals in response to movements made by said operator; and
    wherein said controller is configured to receive thrust-control-signals transmitted from said user interface module, said controller further configured to use at least part of said thrust-control-signal to generate said valve-control-signals thereby allowing said operator to selectively generate thrust without a direct mechanical connection between said water board apparatus and said operator.

2. A water board apparatus for riding waves as in claim 1, further comprising a light module disposed at the front of said board, said light module electrically associated with said controller and wherein said controller is further configured to change the state of said light module in response to a light-control-signal received from said user interface module.

3. A water board apparatus for riding waves as in claim 2, wherein said light module comprises an integral power source and is removably associated with said board structure so that said light module may be disassociated from said board structure and used as a handheld flashlight.

4. A water board apparatus for riding waves as in claim 1, further comprising a deterrent system disposed within said internal void comprising:
    a chemical-dispenser for a housing broad-spectrum-semiochemical mixture comprising a combination of semiochemicals known to be effective for repelling one or more species of sharks and wherein said chemical-dispenser is mechanically associated with said output port;
    wherein said chemical-dispenser is electrically associated with said controller and wherein said chemical-dispenser is configured to dispense said chemical through said output port when activated by said controller; and
    wherein said controller is configured to activate said chemical-dispenser in response to a signal received from said user interface module.

5. A water board apparatus for riding waves as in claim 4, wherein said deterrent system is further configured to deploy a decoy when activated by said controller.

6. A water board apparatus for riding waves as in claim 1, wherein said controller comprises a display for displaying board status information, said board status information comprising at least two of: time data, warning data, fuel level data, battery status data, speed data, temperature data, signal strength data, and direction data.

7. A water board apparatus for riding waves as in claim 1, wherein said user interface module comprises at least one control line configured for being mechanically associated with at least one finger of said operator and wherein said user interface module is configured to generate said thrust-control-signals in response to a change in a control line parameter that varies as said operator makes a fist.

8. A water board apparatus for riding waves as in claim 1, wherein said controller further comprise a position-finder for generating location-data and transmitting said location-data to said user interface module.

9. A water board apparatus for riding waves as in claim 8, wherein said controller is further configured to perform an anti-theft function using said location-data.

10. A water board apparatus for riding waves as in claim 9, further comprising an imaging element for generating image data and wherein said anti-theft function comprises activating said imaging element and transmitting image data to said user interface module when the location-data changes by a predefined amount.

11. A portable user interface for controlling a powered riding apparatus, wherein said powered riding apparatus comprises a controller comprising a receiver, said controller configured to control said powered riding apparatus in response to received apparatus-control-signals, said portable user interface comprising:
- a housing configured for being associated with and carried by a powered riding apparatus user;
- a processing device disposed within said housing and electrically associated with at least one of (a) on-chip memory and (b) off-chip memory;
- a first transmitter disposed within said housing and electrically associated with said processing device, said first transmitter configured for relatively short range communications between said user and said powered riding apparatus;
- a user-control-signal-generator configured for being mechanically associated with said user and configured to generate user-control-signals in response to input from said user;
- a control signal interface disposed within said housing and in communication with said user-control-signal-generator and further electrically associated with said processing device, wherein said user control signal interface is configured to transfer said user control signals to said processing device;
- a display electrically associated with said processing device;
- a power source disposed within said housing and electrically associated with at least one of said processing device, said first transmitter, said control signal interface, user-control-signal-generator and said display; and
- wherein said processing device is configured to generate apparatus-control-signals in response to said user-control-signals and transmit said apparatus-control-signals to a controller associated with said powered riding apparatus.

12. A portable user interface for controlling a powered riding apparatus as in claim 11, wherein said user-control-signal-generator is a glove apparatus worn by a user comprising at least one control line running along at least one finger of said glove wherein an electrical parameter of said control line changes as said user makes a fist.

13. A portable user interface for controlling a powered riding apparatus as in claim 11, further comprising a receiver electrically associated with said processing device and wherein said powered riding apparatus is a surfboard comprising propulsion system electrically associated with a controller, said controller in wireless communication with said portable user interface, and wherein said processing device is configured to use said first receiver to receive wave-information-data transmitted by a remote system.

14. A portable user interface for controlling a powered riding apparatus as in claim 13, wherein said processing device is configured to use said wave-information-data to calculate estimated time of arrival (ETA) data for at least one wave.

15. A portable user interface for controlling a powered riding apparatus as in claim 14, wherein said processing device is further configured to display wave information on said display.

16. A portable user interface for controlling a powered riding apparatus as in claim 15, wherein said processing device is further configured to monitor said wave-information-data for a predefined set of wave parameters and issue a warning when said predefined set of wave parameters is detected.

17. A portable user interface for controlling a powered riding apparatus as in claim 16, wherein said predefined set of wave parameters is a clean-up-wave-set.

18. A wave-information-system for providing surfers with information on approaching waves while surfing, said wave-information-system comprising;
- a buoy module configured for being associated with a buoy and further configured for detecting a plurality of wave parameters;
- a buoy controller (a) that is one of integral to and (b) electrically associated with said buoy module, said buoy controller comprising a processing device electrically associated with a memory, a transmitter, a location-data-sensor, and a power source;
- wherein said processing device is configured to receive wave-data from said buoy module and transmit a wave-data-signal to a remote device;
- wherein said wave-data-signal comprises at least one wave parameter, a time stamp, and buoy time data; and
- a portable user interface configured for being associated with a surfer and further configured for receiving said wave-data-signal.

19. A wave-information-system for providing surfers with information on approaching waves as in claim 18, wherein said wave parameters included at least three of: water line, wave amplitude, wave crest, wave height, trough, water depth, wave length, wave speed, and propagation direction.

20. A wave-information-system for providing surfers with information on approaching waves as in claim 19, further comprising:
- a sonar sensor electrically associated with said processing device;
- wherein at least one sonar profile for an object is stored in said memory;
- wherein said processing device is further configured to use said sonar sensor to detect a real time sonar profile for an object and compare said real time sonar profile with said at least one sonar profile stored in said memory and generate sonar-data based on said comparison and transmit a sonar-data signal.

* * * * *